US012735083B2

(12) United States Patent
Durkin

(10) Patent No.: US 12,735,083 B2
(45) Date of Patent: Sep. 15, 2026

(54) WASHOUT RECLAIMING SYSTEM HAVING A WHEELBARROW

(71) Applicant: Shane Durkin, Sioux Falls, SD (US)

(72) Inventor: Shane Durkin, Sioux Falls, SD (US)

( * ) Notice: Subject to any disclaimer, the term of this patent is extended or adjusted under 35 U.S.C. 154(b) by 298 days.

(21) Appl. No.: 18/581,748

(22) Filed: Feb. 20, 2024

(65) Prior Publication Data

US 2024/0286659 A1 Aug. 29, 2024

Related U.S. Application Data

(60) Provisional application No. 63/486,764, filed on Feb. 24, 2023.

(51) Int. Cl.
*B62B 1/20* (2006.01)

(52) U.S. Cl.
CPC .................................... *B62B 1/204* (2013.01)

(58) Field of Classification Search
CPC .............. B62B 1/18; B62B 1/20; B62B 1/204
See application file for complete search history.

(56) References Cited

U.S. PATENT DOCUMENTS 97,753 A * 12/1869 Bitner, Jr. ................. B60P 1/56 298/24
2,926,021 A * 2/1960 Altadonna .............. B62B 13/18 280/5.2
6,193,265 B1 * 2/2001 Yemini ...................... B62B 1/22 280/653
7,203,994 B2 * 4/2007 Smith ...................... A47L 9/102 15/409
8,651,341 B1 * 2/2014 Luther ...................... A01C 5/02 111/95
9,067,616 B1 * 6/2015 Tabrizi ....................... B62B 1/18
2004/0041361 A1 * 3/2004 Lim .......................... B62B 5/06 280/47.31
2013/0056397 A1 * 3/2013 Geller ...................... B62B 1/204 209/352
2019/0380534 A1 * 12/2019 Patterson .................. B62B 1/18

* cited by examiner

*Primary Examiner* — Erez Gurari
(74) *Attorney, Agent, or Firm* — Leanne Taveggia Farrell; Westman, Champlin & Koehler, P.A.

(57) ABSTRACT

A washout reclaiming system includes a wheelbarrow. The wheelbarrow includes a tray having an interior surface, an opposing exterior surface and a through hole extending from the interior surface to the exterior surface. A grate is mounted to the interior surface of the tray and is configured to cover the through hole in the tray of the wheelbarrow. The grate includes a plurality of perforations sized large enough to allow a contaminated portion of a washout to pass through the through hole and sized small enough to prevent a clean portion of the washout from passing through the through hole in the tray of the wheelbarrow.

18 Claims, 11 Drawing Sheets

WASHOUT RECLAIMING SYSTEM HAVING A WHEELBARROW

CROSS-REFERENCE TO RELATED APPLICATION

The present application is based on and claims the benefit of U.S. provisional patent application Ser. No. 63/486,764, filed Feb. 24, 2023, the content of which is hereby incorporated by reference in its entirety.

BACKGROUND

Concrete washout and reclaiming systems are designed to recover aggregate, recycle water and reduce concrete washout waste. In these types of systems, water is added to the unused concrete in a concrete, ready mix truck and the material is discharged into a separator system which washes the aggregate materials so that they may be reused back in the mix. The grey or cementitious water from the separation process is transferred to a holding tank for later, safe disposal.

The discussion above is merely provided for general background information and is not intended to be used as an aid in determining the scope of the claimed subject matter. The claimed subject matter is not limited to implementations that solve any or all disadvantages noted in the background.

SUMMARY

A washout reclaiming system includes a wheelbarrow. The wheelbarrow includes a tray having an interior surface, an opposing exterior surface and a through hole extending from the interior surface to the exterior surface. A grate is mounted to the interior surface of the tray and is configured to cover the through hole in the tray of the wheelbarrow. The grate includes a plurality of perforations sized large enough to allow a contaminated portion of a washout to pass through the through hole in the tray of the wheelbarrow and sized small enough to prevent a clean portion of the washout from passing through the through hole in the tray of the wheelbarrow.

A washout reclaiming system has a wheelbarrow that includes a tray having an interior surface, an opposing exterior surface and a through hole extending from the interior surface to the exterior surface. A grate is mounted to the interior surface of the tray, is configured to cover the through hole in the tray and includes a plurality of perforations. A drain tub is mounted to the exterior surface of the tray. A portion of the drain tub is configured to be located below the through hole in the tray.

A washout reclaiming system includes a wheelbarrow, a reclaiming hose, a reclaiming storage tank, a spray hose and a clean water tank. The wheelbarrow includes a tray having an interior surface, an opposing exterior surface and a through hole extending from the interior surface to the exterior surface. The wheelbarrow further includes a grate mounted to the interior surface of the tray and configured to cover the through hole in the tray. The grate includes a plurality of perforations. The wheelbarrow further includes a drain tub mounted to the exterior surface of the tray. A portion of the drain tub is configured to be located below the through hole in the tray and the drain tub has a bottom wall that includes an opening. The reclaiming hose has a first end coupled to the opening in the drain tub and a second end coupled to a washout pump and reclaiming storage tank. The spray hose is coupled to a clean water tank. The spray hose sends washout material into the tray of the wheelbarrow, the grate allows a contaminated portion of the washout material to proceed through the through hole in the tray to the drain tub and keeps a clean portion of the washout material in the tray and the washout pump sucks the contaminated portion of the washout material from the drain tub through the reclaiming hose to the reclaiming storage tank.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Concrete is made of cement (a manufactured chemical combination of lime, silica, alumina, magnesia, sulfur trioxide, alkaline, iron oxide and calcium sulfate), aggregates, such as sand and gravel, and water. Cement is a caustic and corrosive material and its curing and drying properties are a continuous and fluid event. Therefore, at the end of every concrete pour, there is a washing and cleaning process. The driver of a concrete truck needs to clean concrete from the drums, the chutes and the hoppers of the truck and the contractor who is pouring and molding the concrete on-site needs to clean concrete from wheelbarrows and hand tools. The driver and the contractor or contractor's laborers use the water from the concrete truck's water tank to perform the cleaning process. The cleaning process creates a slurry of waste called a washout. The washout is messy and contaminates the environment if not properly disposed.

The problem for many concrete truck drivers is finding a designated washout collector. If a washout collector exists, it's usually unkempt, messy with pollutants and may spill on the ground. However, well kept, designated washout collectors have several problems too. They are labor intensive, most of the time they ultimately leak and soak into the ground. At times contractors use waste box containers ranging from plastic lined cardboard, plastic containers and metal containers. These containers are expensive and do not last long because of concrete's corrosiveness. In addition, the driver does not read instructions, which may lead to neglect. At times there is no communication between contractors and drivers and the driver will find their own washout spot, causing problems with property owners and municipalities.

Many concrete trucks are equipped with reclaimer buckets, hoses and pumps where the washout collected in the reclaimer bucket is fed via a hose and pump to a washout reservoir located on the concrete truck. The reclaimer buckets are heavy, may become full of aggregate when the caustic washout is pumped out from the bucket and take more time to do a proper wash and clean. Many times trucks sneak behind trees, equipment and building to washout, so they don't have to use the reclaimer buckets. Another problem with the reclaimer buckets is the bucket belongs to the driver, and the contractor, at times, believes the driver should take the clean aggregate left in the bucket back to the plant. A reclaimer bucket is heavy enough. A reclaimer bucket full of aggregate is extremely heavy. A concrete truck with a gravity fed container from the reclaimer bucket has to empty it at the plant. If forgotten it can freeze or not be used again because the reclaimer bucket is already full of aggregate from previous jobs.

Figure 1:
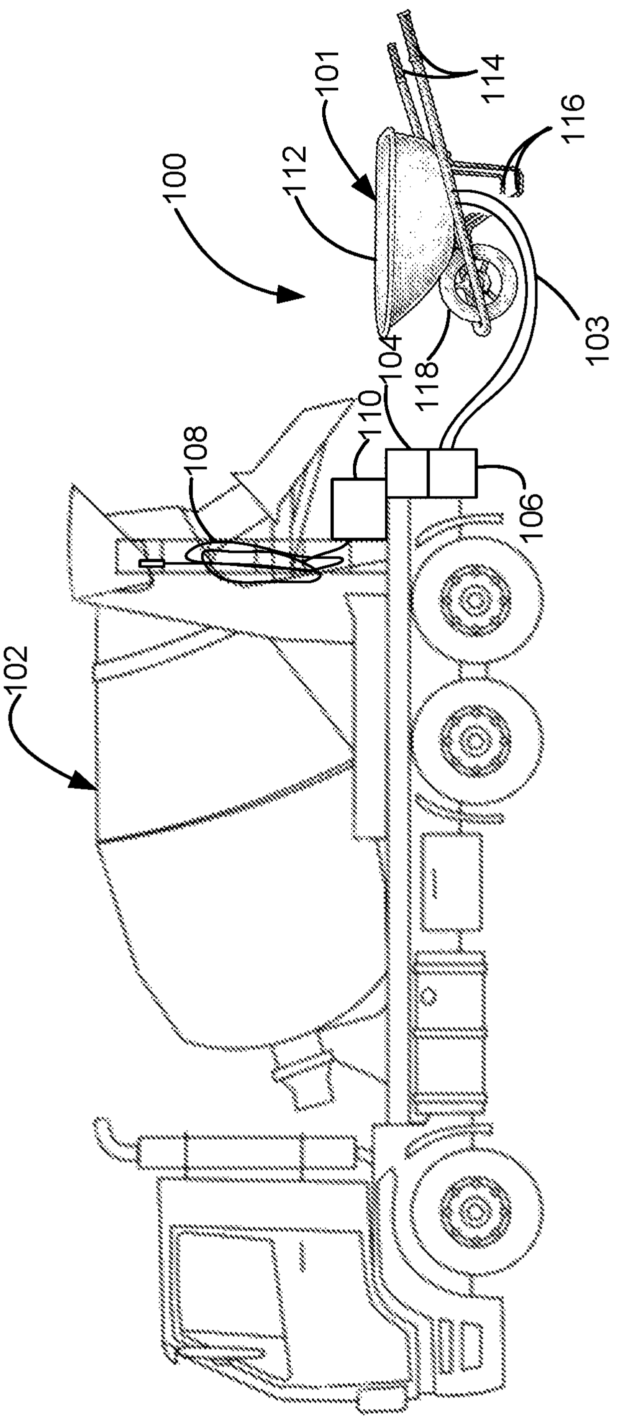
FIG. 1 illustrates a perspective view of washout reclaiming system that includes a specialized wheelbarrow according to various embodiments.

Described herein are embodiments of a washout reclaiming system that uses a specialized wheelbarrow. FIG. 1 illustrates a perspective view of washout reclaiming system 100 that includes a specialized wheelbarrow 101 according to various embodiments. Besides having a specialized wheelbarrow 101, washout reclaiming system 100 includes a concrete truck 102 having various onboard equipment that are included in washout reclaiming system 100, such as a reclaiming hose 103 coupled to a washout pump 104, a reclaiming storage tank 106 and a spray hose 108 coupled to a water tank 110.

As illustrated in FIG. 1, specialized wheelbarrow 101 is a dual-use piece of equipment that includes standard features of a contractor wheelbarrow including a tray or bed 112 coupled to handles 114, legs 116 and a tire or wheel 118. Specialized wheelbarrow 101 may be used to haul concrete from the chute of the concrete truck to the site for the concrete pour. Specialized wheelbarrow 101 may also be used for the washout reclaiming process after the concrete pour is complete. During the washout reclaiming process and as illustrated in FIG. 1, tray 112 of specialized wheelbarrow 101 is moved under the chute of concrete truck 102. Reclaiming hose 102, which is coupled to washout pump 104 and reclaiming container 106 on concrete truck 102, is attached to an underside of tray 112 of specialized wheelbarrow 101.

Figure 2:
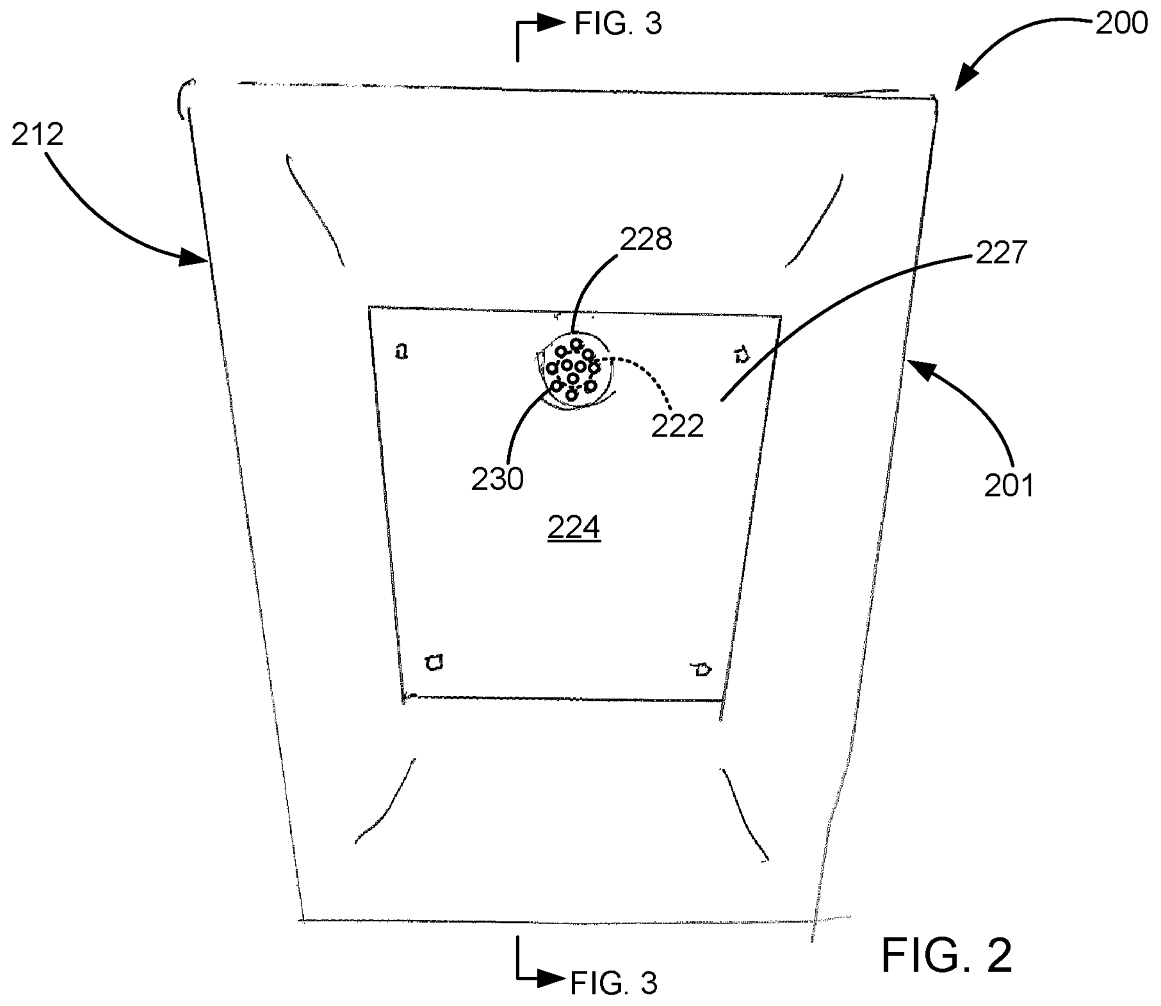
FIG. 2 illustrates a top view of a tray of a specialized wheelbarrow according to an embodiment.
Figure 3:
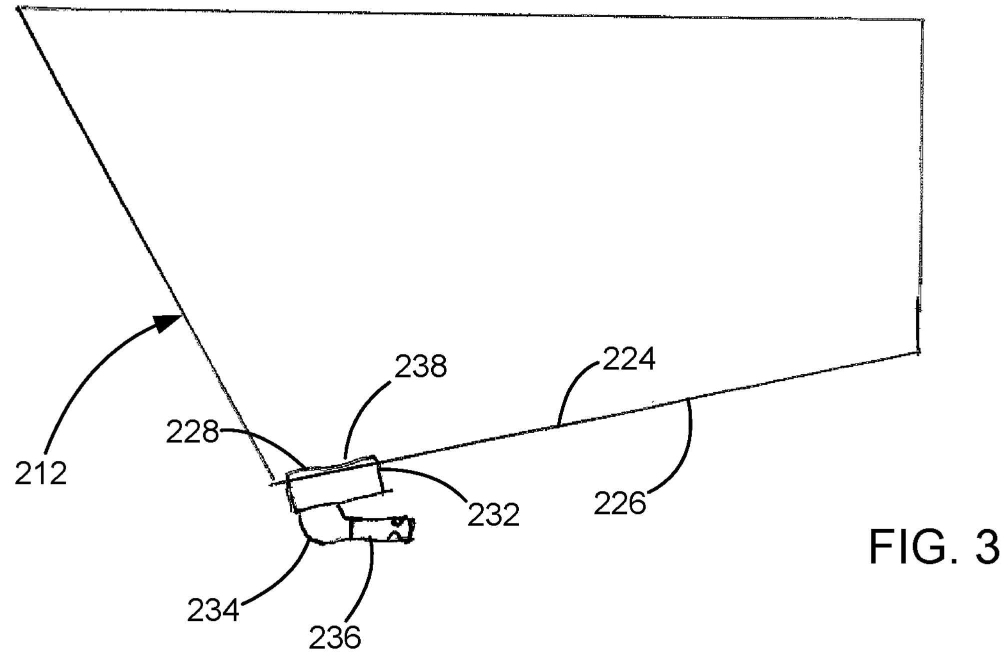
FIG. 3 illustrates a section view of the tray of the specialized wheelbarrow taken through the line indicated in FIG. 2.

FIG. 2 illustrates a top view and FIG. 3 illustrates a section view of a tray 212 of a specialized wheelbarrow 201 of a washout reclaiming system 200 according to an embodiment. Tray 212 of specialized wheelbarrow 201 includes a through hole 222 located at the lowest point of tray 212 and extends from an interior surface 224 of a bottom wall 227 of tray 212 to an opposing exterior surface 226 of the bottom wall 227 of tray 212. Through hole 222 may be as little as 1 inch in diameter or may be greater. For example, through hole 222 may be 1.5 inches. Mounted over and covering through hole 222 on interior surface 224 of the bottom wall of tray 212 is a grate 228 having a plurality of perforations 230 that extend from a top surface 238 of grate through a material thickness of the grate 228. Below through hole 222 and mounted to exterior surface 226 of the bottom wall of tray 212 includes a catch 232. Catch 232 is coupled to and feeds into a short-neck male cam-lock 234. Male cam-lock 234 is coupled to a female cam-lock 236. Female cam-lock 236 is configured to be coupled to reclaiming hose 103, which is coupled to washout pump 104 and reclaiming storage container 106 on concrete truck 102 of FIG. 1. Washout pump 104 is configured to suck slurry and sand (contaminated washout) located in tray 212 into reclaiming storage container 106 on concrete truck 102, leaving clean aggregate (clean washout), such as gravel and rock, in specialized wheelbarrow 201 for recycling.

As illustrated in FIG. 2, grate 228 may be disc-shaped and have plurality of perforations 230. Disc grate 228 is made of robust materials, such as metal, and is configured to not interfere with tools that are used in conjunction with tray 220 of wheelbarrow 201 for hauling concrete from the chute of the concrete truck to the site for pouring. In FIG. 3, grate 228 is illustrated as having a height that will not interfere with concrete tools, such as a shovel or rake, during a concrete pour. In FIGS. 2 and 3, grate 228 may be one inch in height. However, other heights are possible. Perforations 230 are large enough to allow water, slurry and small particles of sand to pass through to male cam-lock 234, female cam-lock 236 and the reclaiming hose during a washout reclaiming process, but not large enough to allow gravel and aggregate to pass through. For example perforations 230 may be ⅛ to ⅜ inch in diameter. For example, the diameter of each perforation 230 may be ¼ of an inch.

Figure 4:
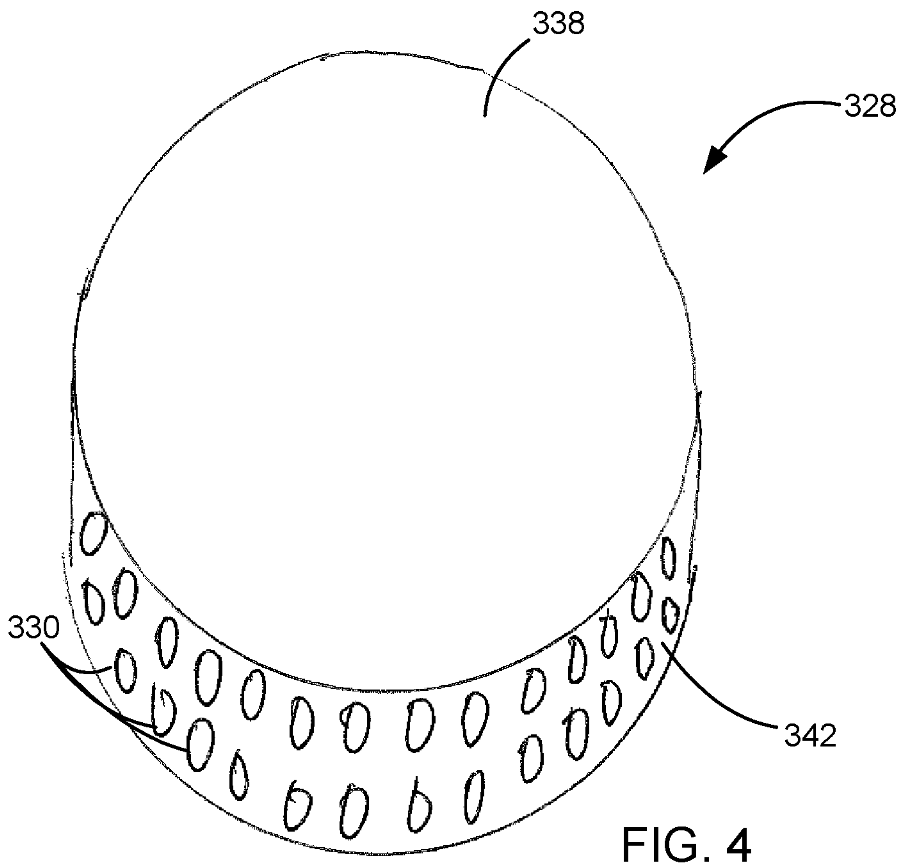
FIG. 4 illustrates a perspective view of a grate according to an embodiment.
Figure 5:
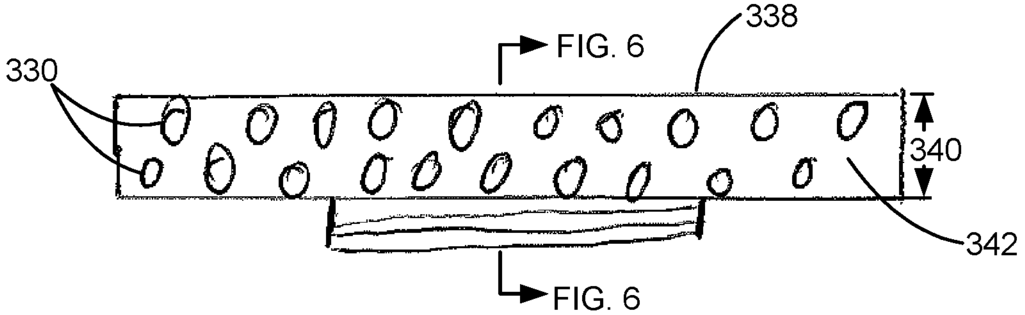
FIG. 5 illustrates a side view of the grate shown in FIG. 4.
Figure 6:
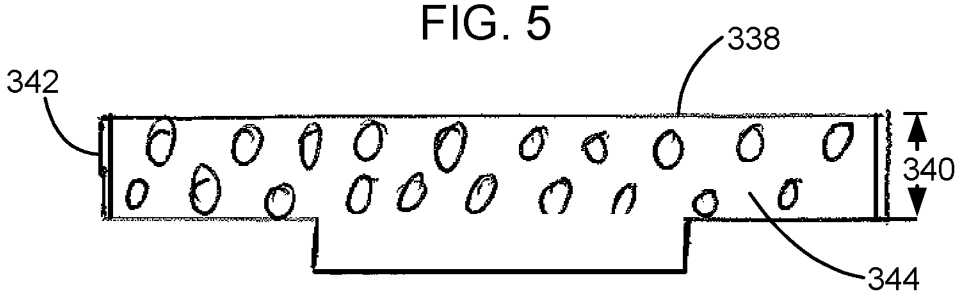
FIG. 6 illustrates a section view of the grate taken through the section line indicated in FIG. 5.

FIGS. 4-6 illustrate an alternative grate 328 that is configured to be mounted over and cover through hole 222. In one embodiment, grate 328 may be threaded to through hole 222 or to catch 232 or male cam-lock 234 below tray 212. In particular, FIG. 4 is a perspective view of grate 328, FIG. 5 is a side view of grate 328 and FIG. 6 is a section view of grate 328 taken through the section line indicated in FIG. 5.

Grate 328 includes a solid top 338 free of perforations and a side with a height 340 including a plurality of perforations 330. Solid top 338 that is free of perforations makes it easier for wheelbarrow 201 to be used with tools needed for pouring concrete. For example, a concrete rake will be able to glide over solid top 338. The plurality of perforations 330 extend from an exterior side surface 342 along height 340 of grate 328 to an interior side surface 344 or a thickness of the side of strainer 328. While grate 328 is cylindrical in shape, it is possible for grate 328 to include other geometrical shapes, including being of a rectangular prism shape or cubic shape.

Grate 328 does not need a cap, plug or shut off switch. Perforations 330 are large enough to allow water, slurry and small sand particles to pass through to male cam-lock 234, female cam-lock 236 and the reclaiming hose 103, but not large enough to allow high slump, plasticized material, large particles of sand, rock, dirt, gravel and aggregate to pass through. Therefore, grate 328 is an anti-drip mechanism. Perforations 330 may range in size from ⅛ to ⅜ inch in diameter. For example, the diameter of each perforation 330 may be ¼ of an inch.

Figure 7:
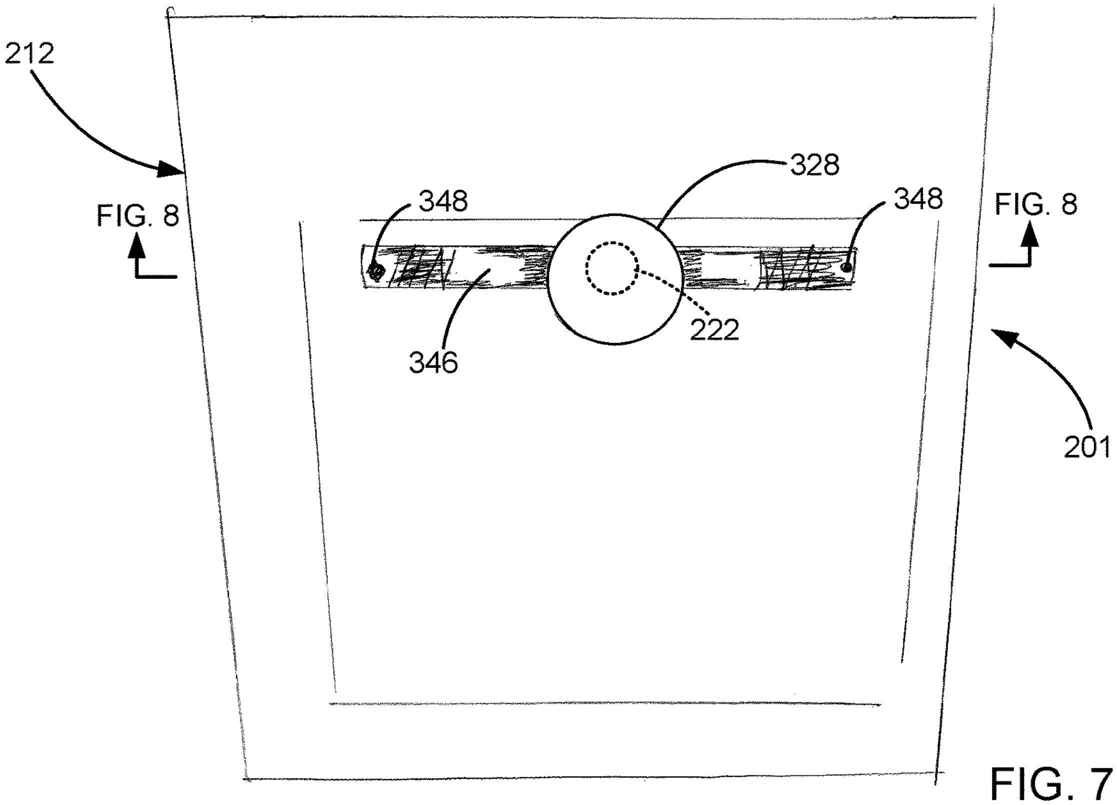
FIG. 7 illustrates a top view of a tray of a specialized wheelbarrow according to an embodiment.
Figure 8:
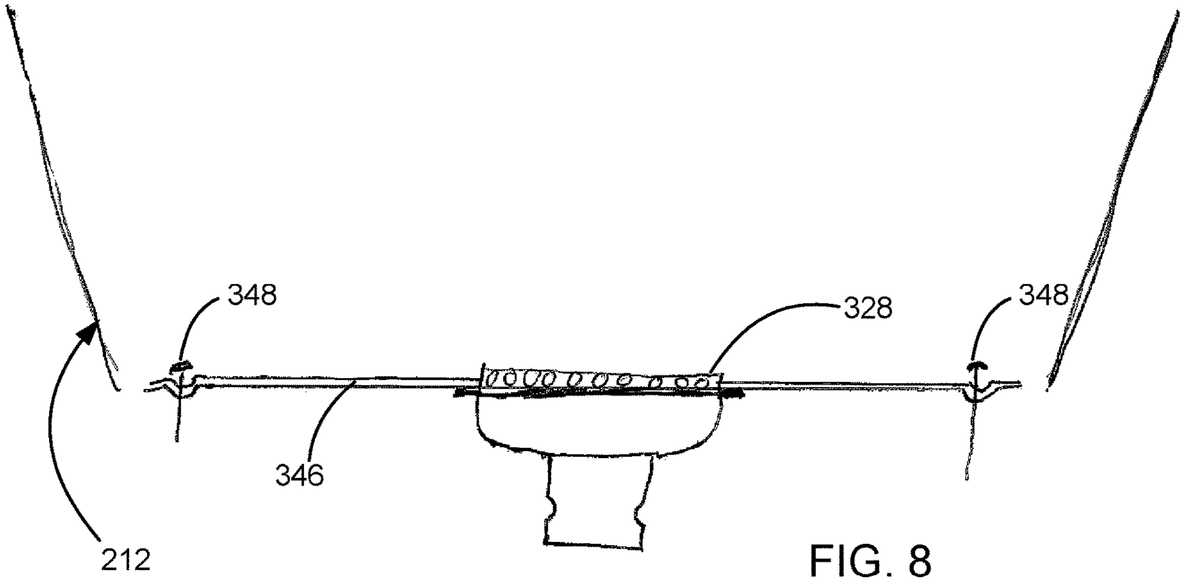
FIG. 8 illustrates a section view of the tray of the specialized wheelbarrow taken through the line indicated in FIG. 7.

FIGS. 7 and 8 illustrate grate 328 mounted over and covering through hole 222 and attached to tray 212 with a flange 346. Flange 346 is configured to be contoured to the shape of tray 212 and is mounted to tray 212 using bolts 348 that attach tray 212 to legs (not illustrated in FIGS. 7 and 8) of wheelbarrow 201. For example, flange 346 may include bolt depressions for receiving bolts 348.

Figure 9:
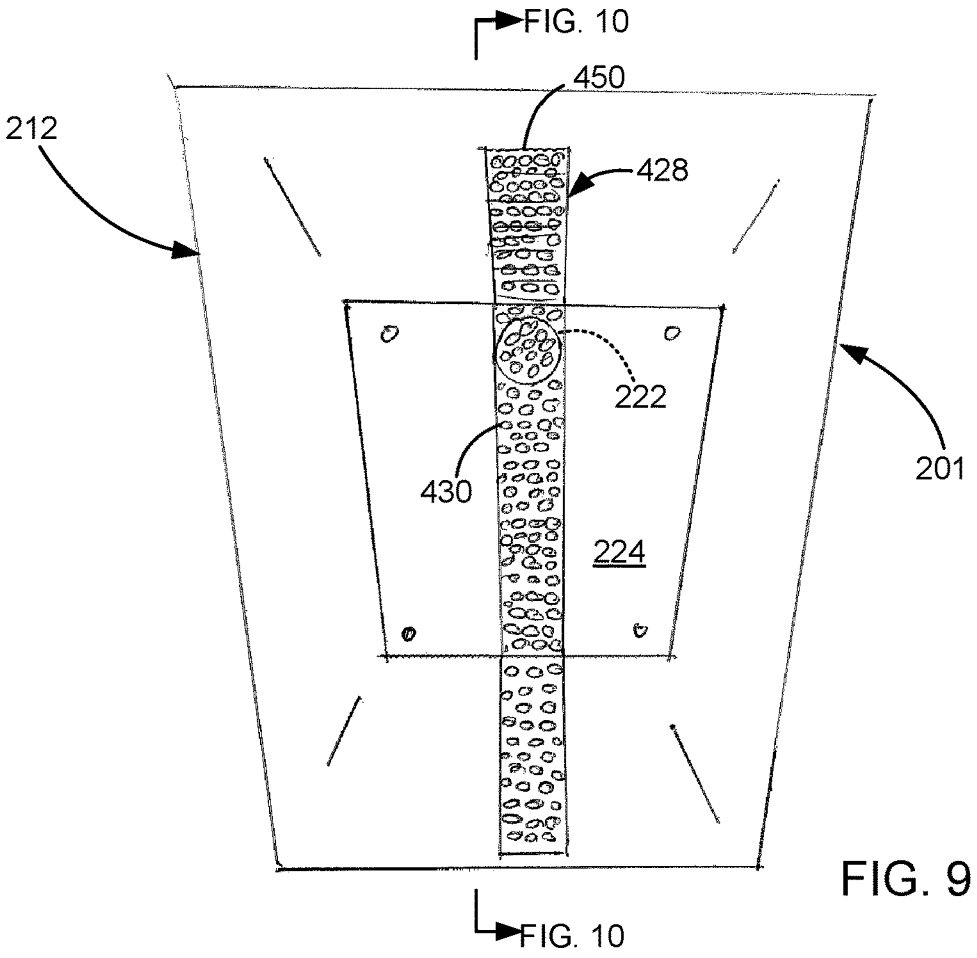
FIG. 9 illustrates a top view of a tray of a specialized wheelbarrow according to an embodiment.
Figure 10:
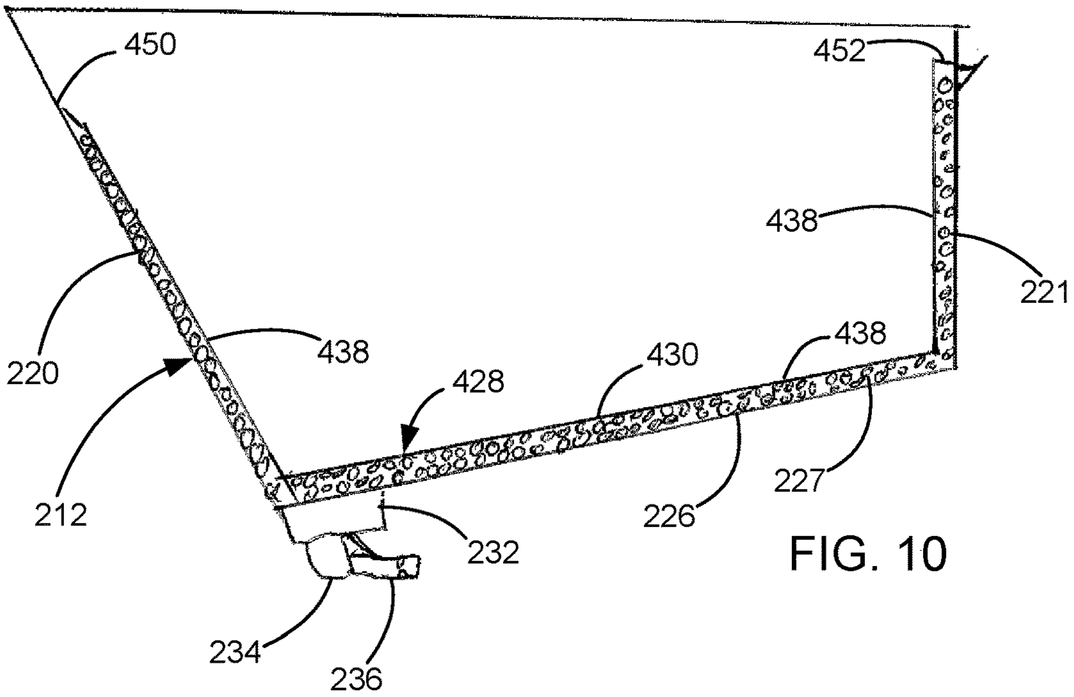
FIG. 10 illustrates a section view of the tray of the specialized wheelbarrow taken through the line indicated in FIG. 9.

FIGS. 9 and 10 illustrate an alternative grate 428 that is configured to be mounted over and covering through hole 222. In particular, FIG. 9 is a top view and FIG. 10 illustrates a section view of tray 212 of wheelbarrow 201 according to an embodiment. Grate 428 has a similar cross section as grate 328, but has an elongated shape with a plurality of perforations 430. Grate 428 is built into or mounted to tray 212 so as to extend along an area of tray 212 that covers a portion of a front wall 220, bottom wall 227 and back wall 221 of tray 212. In particular, grate 428 forms an elongated channel from front to back of tray 212 that is in communication with through hole 222.

Grate 428 is made of a robust material, such as metal, and is configured to not interfere with tools that are used in conjunction with tray 212 of wheelbarrow 201 for hauling concrete from the chute of the concrete truck to the site for pouring. In FIG. 10, front end 450 of grate 428 is tapered from top surface 438 of grate to interior surface of front wall 220 of tray 212. Although not illustrated in FIG. 10, back end 452 of grate 428 may also be tapered from top surface 438 of grate to interior surface of back wall 221 of tray 212. These tapered ends provide a ramp for a concrete tool, such as a concrete rake, to glide onto. While grate 428 is illustrated as having perforations on the sides and top surface 438 of grate 428, it is also possible that grate 428 includes a solid top surface 438 free of perforations and perforations being located only on the sides of grate 428. A top surface 438 free of perforations would further prevent concrete tools, such as concrete rakes, from interfering with grate 428.

In FIG. 10, grate 428 is illustrated as having a height that will also not interfere with concrete tools, such as a shovel or rake, during a concrete pour. In FIG. 10, grate 428 may be one inch in height. However, other heights are possible. Perforations 430 extend through grate 428 and are large enough to allow water, slurry and sand to pass through to male cam-lock 234, female cam-lock 236 and the reclaiming hose during a washout reclaiming process, but not large enough to allow aggregate to pass through. For example perforations 230 may be ⅛ to ⅜ inch in diameter. For example, the diameter of each perforation 230 may be ¼ of an inch.

Figure 11:
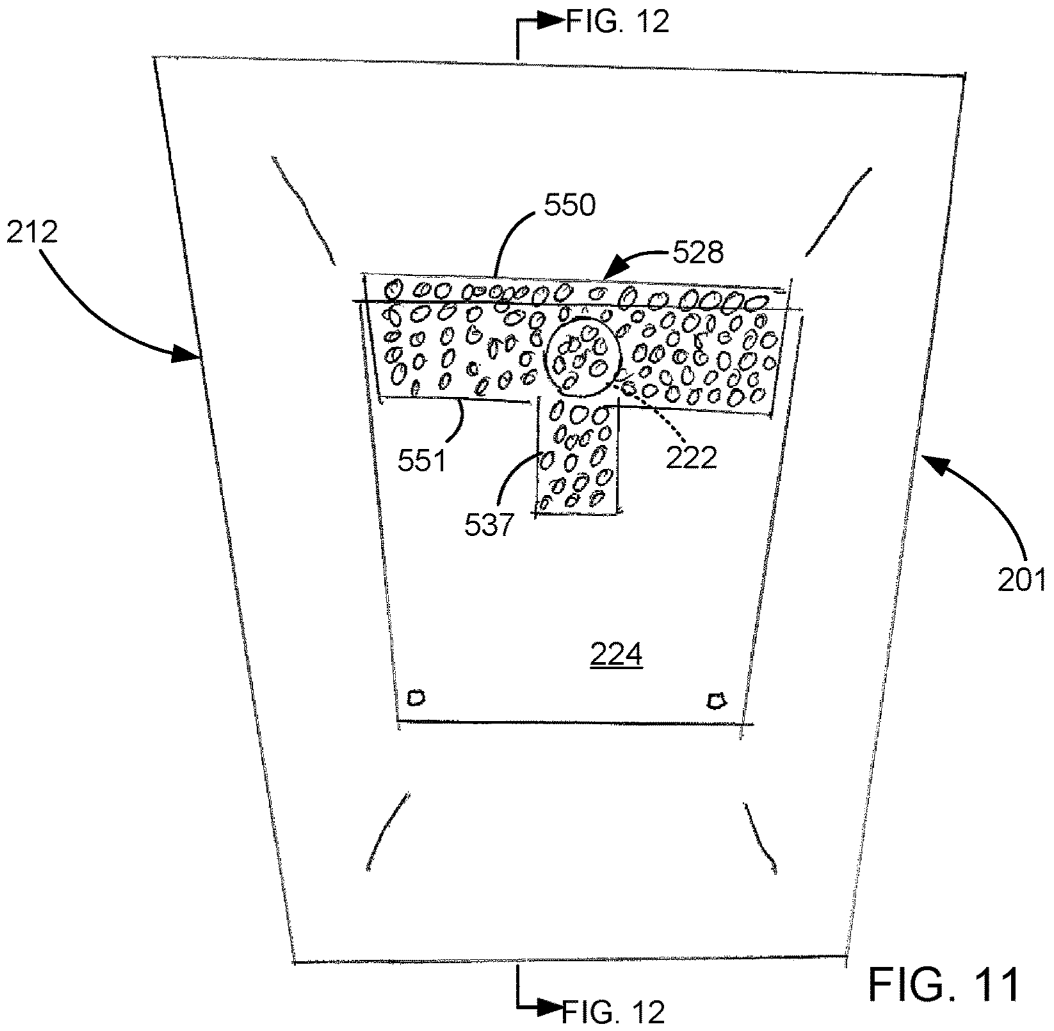
FIG. 11 illustrates a top view of a tray of a specialized wheelbarrow according to an embodiment.
Figure 12:
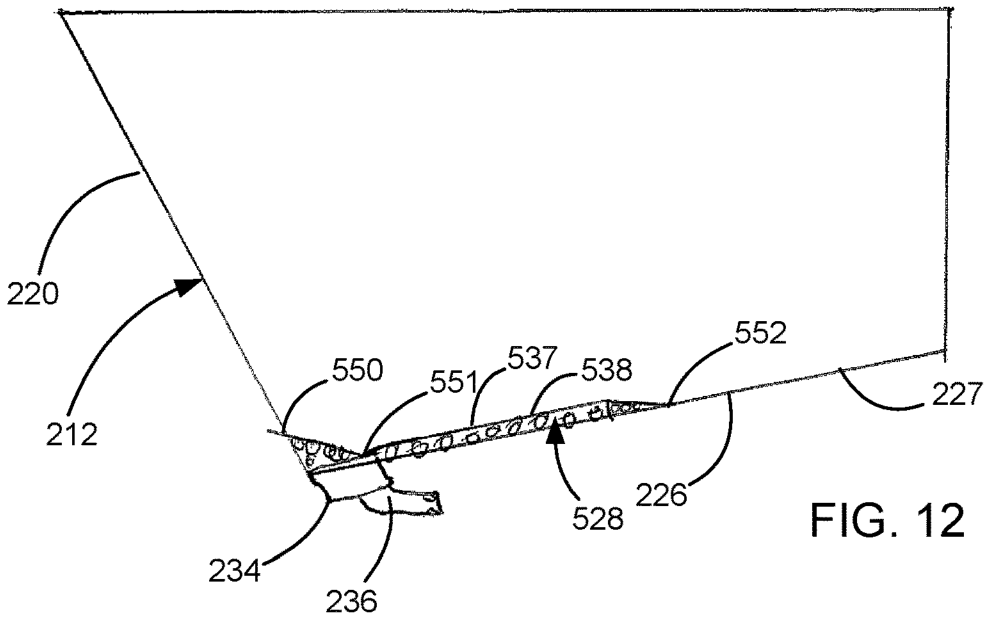
FIG. 12 illustrates a section view of the tray of the specialized wheelbarrow taken through the line indicated in FIG. 11.

FIGS. 11 and 12 illustrate an alternative grate 528 that is configured to be mounted over and covering through hole 222. In particular, FIG. 11 is a top view and FIG. 12 illustrates a section view of tray 212 of wheelbarrow 201 according to an embodiment. Grate 528 is similar to grate 428 in that it covers a surface area of interior surface 224 of tray 212 that is greater than the area of through hole 222, but has a different shape. Grate 528 includes plurality of perforations 530 and is built into tray 212 so as to extend along an area of tray 212 that covers a portion if not all of the front wall 220 and front portion of the bottom wall 227 of tray 212. In particular, grate 528 forms a separation area at the front wall 220 and bottom wall 227 of tray 212 and is in communication with through hole 222. Grate 528 is made of a robust material, such as metal, and is configured to not interfere with tools that are used in conjunction with tray 212 of wheelbarrow 201 for hauling concrete from the chute of the concrete truck to the site for pouring.

In FIG. 12, there is a taper at front end 550 of grate 528 and at back end 551. Front end 550 is located at front wall 220 of tray 212 and back end 551 is located at bottom wall 227 of tray 212. An extension 537 extends from back end 551 and runs channel-like along the bottom wall of tray 212 to an extension end 552. Extension end 552 terminates at a taper from top surface 538 of grate 528 to bottom 226 of tray 212. These tapered front and back ends provide a ramp for a concrete tool, such as a concrete rake, to glide onto. While grate 528 is illustrated as having perforations on the sides and the top surface 538 of grate 528, it is also possible that grate 528 includes a solid top surface 538 free of perforations and perforations are included only on the sides of grate 528. A top surface free of perforations would further prevent concrete tools, such as concrete rakes, from interfering with grate 528.

In FIG. 12, grate 528 is illustrated as having a height that will not interfere with concrete tools, such as a shovel or rake, during a concrete pour. In FIG. 12, grate 528 may be one inch in height. However, other heights are possible. Perforations 530 extend through grate 528 and are large enough to allow water, slurry and sand to pass through to male cam-lock 234, female cam-lock 236 and the reclaiming hose 103 during a washout reclaiming process, but not large enough to allow aggregate to pass through. For example perforations 530 may be ⅛ to ⅜ inch in diameter. For example, the diameter of each perforation 530 may be ¼ of an inch.

Figure 13:
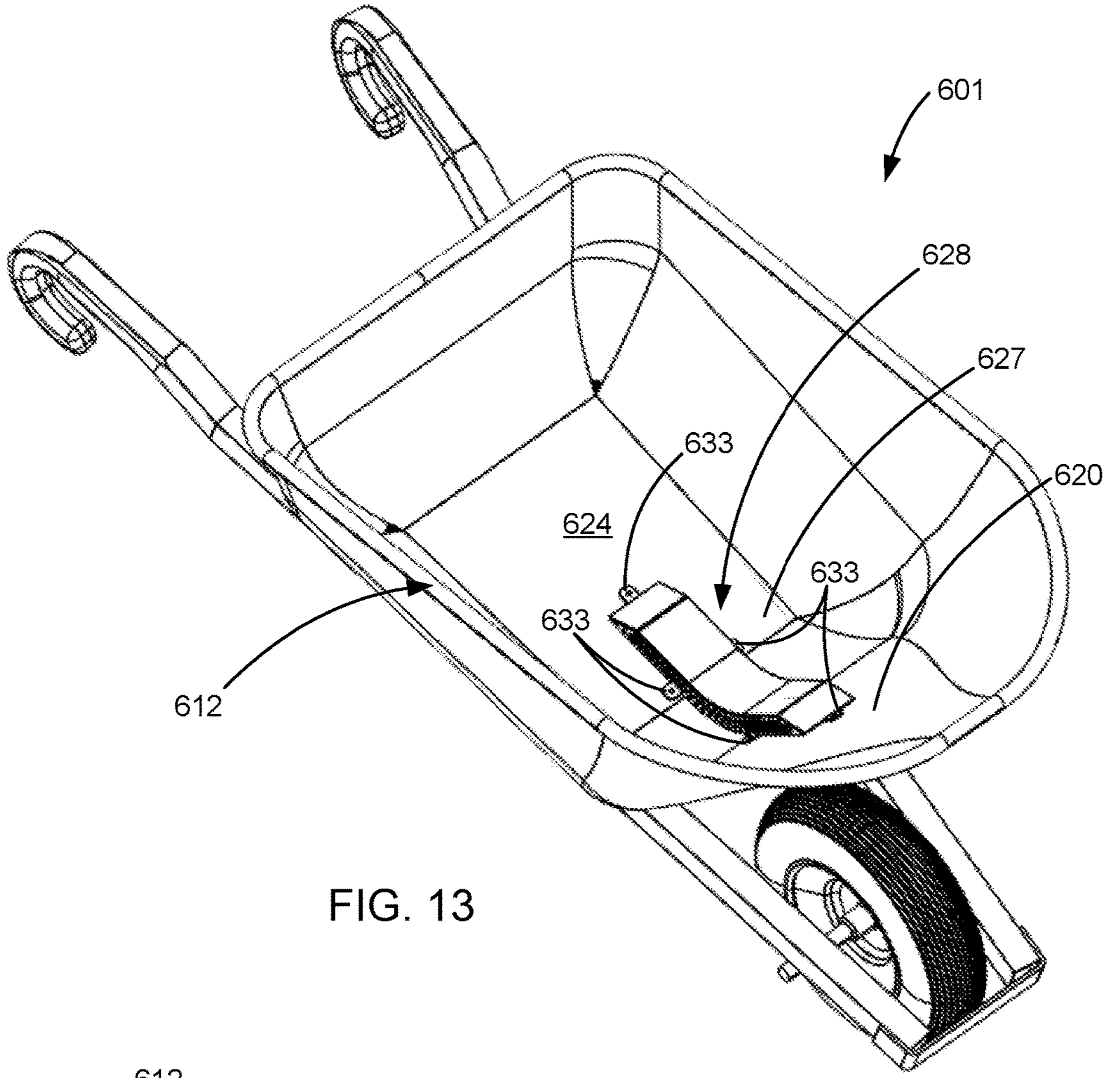
FIG. 13 illustrates a top perspective view of a specialized wheelbarrow having a tray with a mounted grate according to an embodiment.
Figure 14:
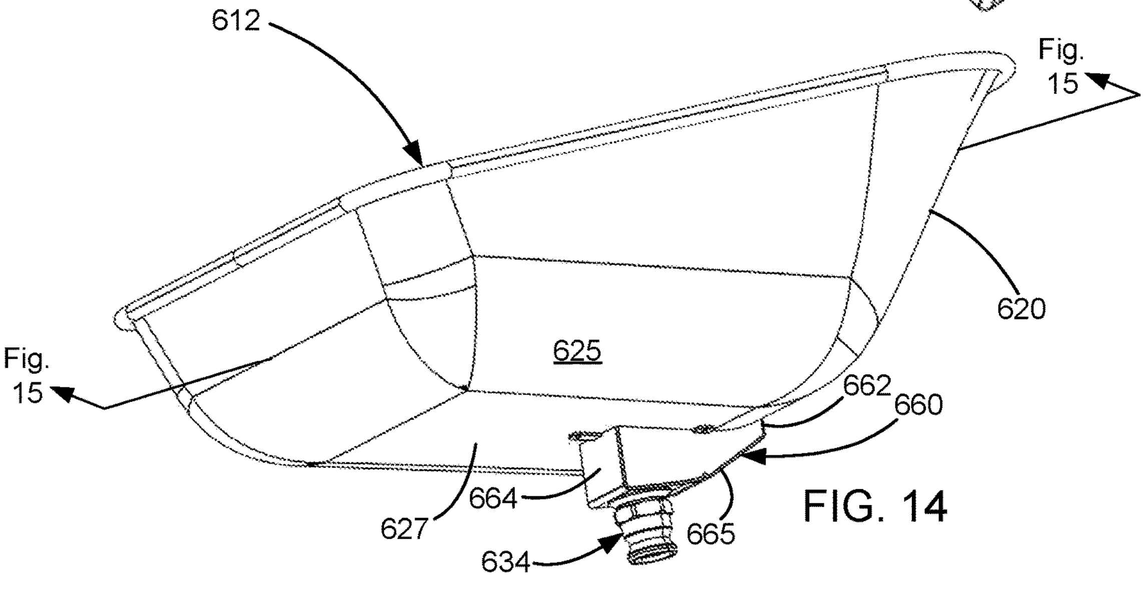
FIG. 14 illustrates a bottom perspective view of the tray illustrated in FIG. 13.
Figure 15:
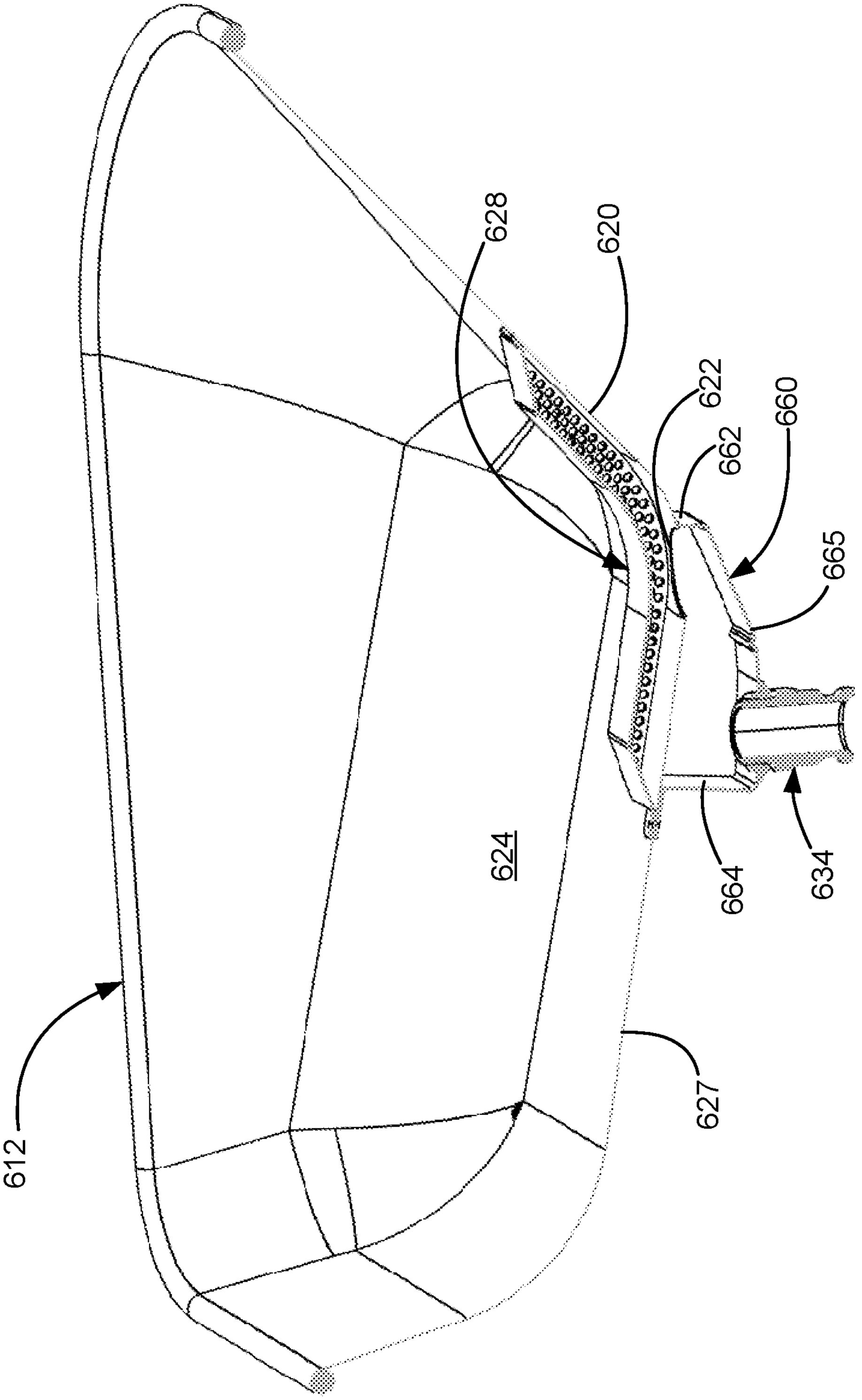
FIG. 15 illustrates a section view of the tray with mounted grate and drain tub of FIG. 14 taken through the section line indicated in FIG. 14.

FIGS. 13-15 illustrate another alternative grate 628 that is configured to be mounted over and covering a through hole in a tray 612 of a specialized wheelbarrow 601. In particular, FIG. 13 is a top perspective view of specialized wheelbarrow 601 having tray 612 and grate 628 according to an embodiment. FIG. 14 illustrates a bottom perspective view of tray 612 including a sink or drain tub 660 that extends along an exterior surface 625 of tray 612 and a male cam-lock 634 coupled to sink or drain tub 660. FIG. 15 illustrates a section view of tray 612 taken through the section line indicated in FIG. 14. Grate 628 is similar to grate 428 in that it covers a surface area of interior surface 624 of tray 612 that is greater than the area of a through hole 622 (see FIG. 15) and is rectangular, but grate 628 also includes other features.

As illustrated in FIG. 13, grate 628 is mounted to and extends along interior surface 624 of tray 612 in an area that covers a portion of the front wall 620 and front portion of a bottom wall 627 of tray 612 where through hole 622 (See FIG. 15) in bottom wall 627 is located. For example, flanges 633 are used to receive mounting hardware for mounting grate 628 to interior surface 624 of tray 612. Grate 628 is made of a robust material, such as metal, and is configured to not interfere with tools that are used in conjunction with tray 612 of wheelbarrow 601 for hauling concrete from the chute of the concrete truck to the site for pouring.

Figure 16:
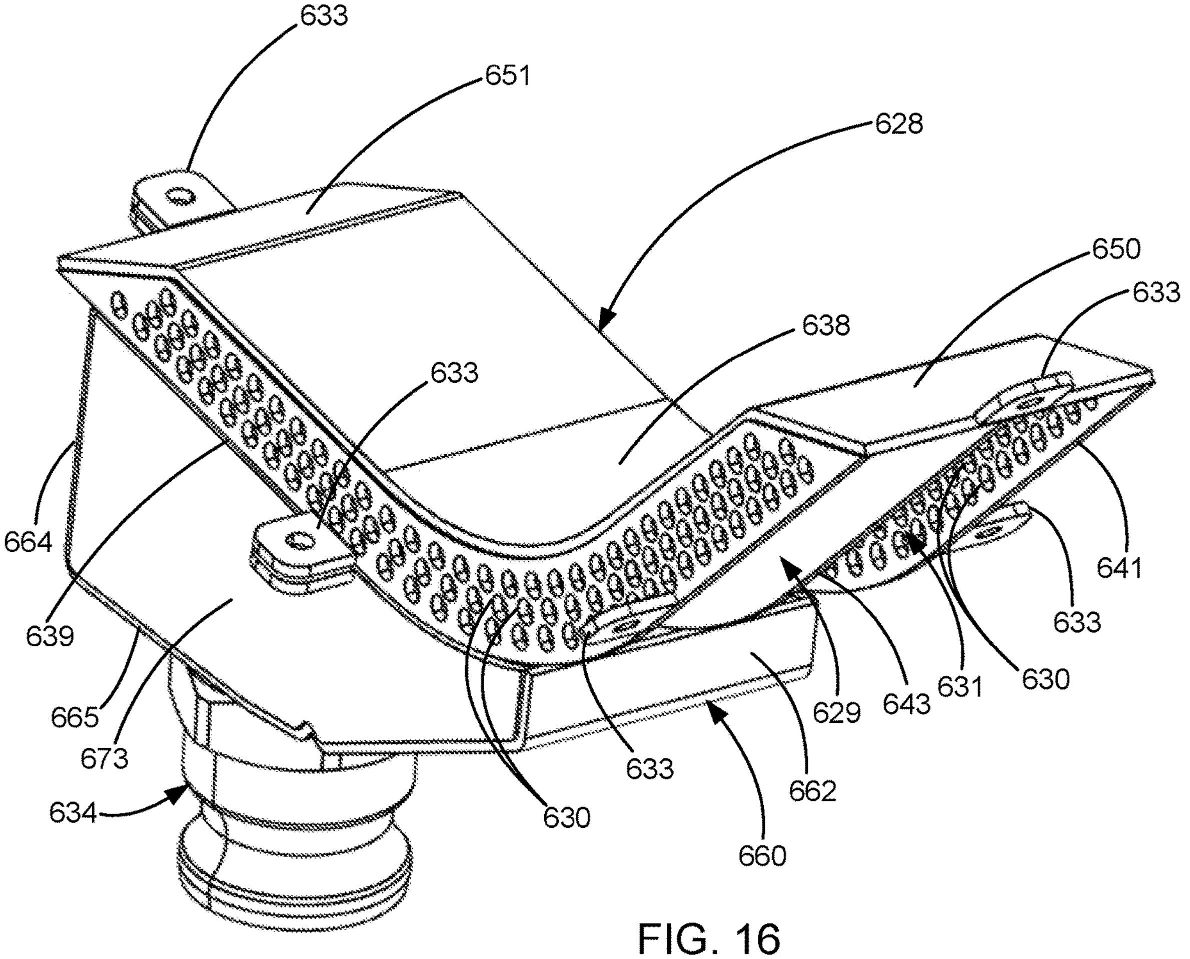
FIG. 16 illustrates an enlarged perspective view of the grate and sink or drain tub illustrated in FIGS. 14-15 with the tray removed.
Figure 17:
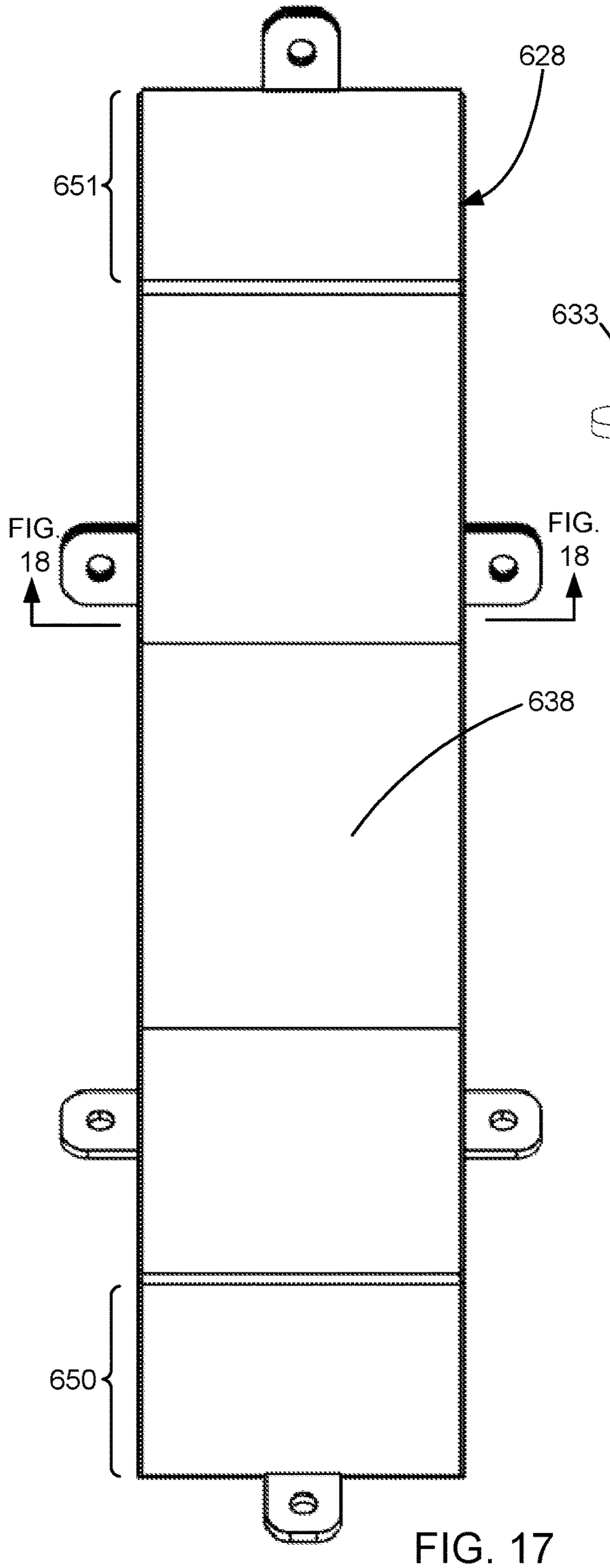
FIG. 17 is a top view of the grate illustrated in FIGS. 13-16.
Figure 18:
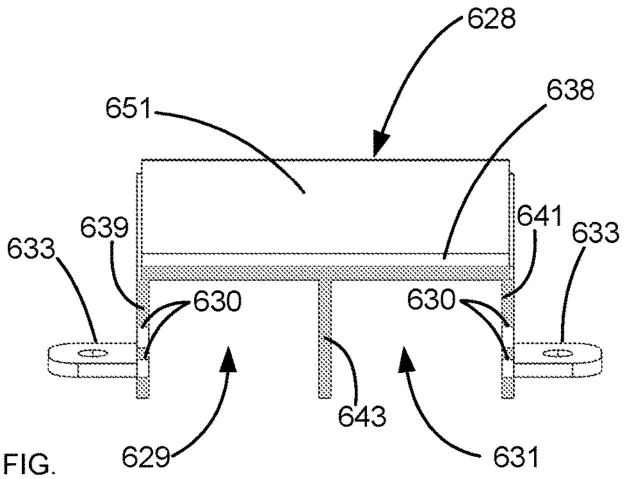
FIG. 18 illustrates a section view of the grate taken through the section line indicated in FIG. 17.

FIG. 16 illustrates a perspective view of grate 628, sink or drain tub 660 and male cam-lock 634 with tray 612 removed for purposes of illustration. FIG. 17 illustrates a top view of grate 628. FIG. 18 illustrates a section view of grate 628 taken through the section line indicated in FIG. 17. Grate 628 has a solid top plate 638 free of perforations, a pair of opposing elongated side plates 639 and 641 and an optional elongated central plate 643 located between and spaced apart from the pair of opposing elongated side plates 639 and 641. Each of the pair of opposing side plates 639 and 641 includes a plurality of perforations or permeated holes 630 while central plate may be solid and free of perforations. Perforations or holes 630 are large enough to allow contaminated washout, such as contaminated water, slurry and sand, to pass through to be fed to male cam-lock 634, female cam-lock, such as female cam-lock 236, and the reclaiming hose, such as reclaiming hose 103, during a washout reclaiming process, but not large enough to allow clean washout, such as aggregate, to pass through. For example, perforations or holes 630 may be ⅛ to ⅜ inch in diameter. For example, the diameter of each perforation or hole 630 may be ¼ of an inch.

Figure 19:
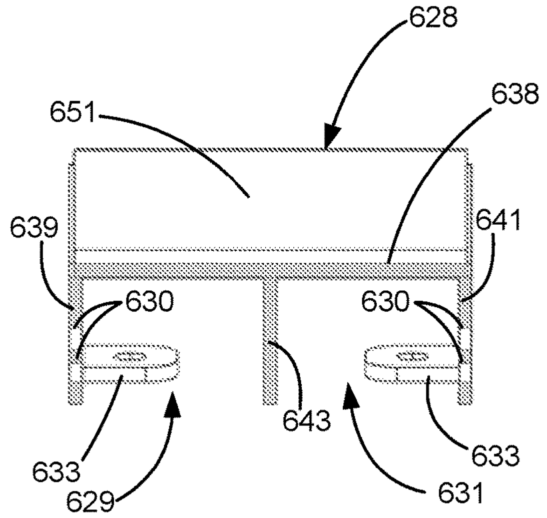
FIG. 19 illustrates a section view of the grate with an alternative mounting configuration according to an embodiment.

Grate 628 has a taper at front end 650 of grate 628 and at a back end 651. Front end 650 abuts or is adjacent to front wall 620 of tray 612 and back end 651 abuts or is adjacent to bottom wall 627 of tray 612. These tapered front and back ends 650 and 651 provide a ramp for a concrete tool, such as a concrete rake, to glide onto solid top plate 638. Grate 628 also provides one or more channels between top plate 628 and interior surface 624 of tray 612 that extend between the taper at front end 650 to the taper at back end 651 so that contaminated washout may enter through any of perforations 630 in side plate 639 and 641 and, by way of gravity, proceed to the through hole 622 in bottom wall 627 of tray 612, which is at the lowest point in tray 612. With optional central plate 643 in place, grate 628 forms two channels—a first channel 629 between side plate 639 and central plate 643 and a second channel 631 between side plate 641 and central plate 643. FIG. 19 illustrates a section view of grate 628 with an alternative mounting configuration according to an embodiment. In FIGS. 13 and 15-18, flanges 633 extend outwardly from grate 628. In FIG. 19, it is also possible for flanges 633 to extend inwardly from grate 628. In FIG. 19, the base of flanges 633 are coupled to an interior of side plates 639 and 641. In this way the flanges 633 and mounting hardware do not interfere with concrete tools, such as a shovel or rake, during a concrete pour.

As illustrated in FIGS. 14 and 15, coupled to exterior surface 625 of bottom wall 627 of tray 612 is a sink or drain tub 660 that extends along the bottom wall 627 of tray 612. Sink, catch or drain tub 660 extends from the break point of tray 612 where front wall 620 meets bottom wall 627 and terminates along bottom wall 627. As illustrated in FIGS. 14, 15 and 16, drain tub 660 has a front wall 662, a back wall 664, a bottom wall 665 and opposing side walls 673 and 675.

Figure 20:
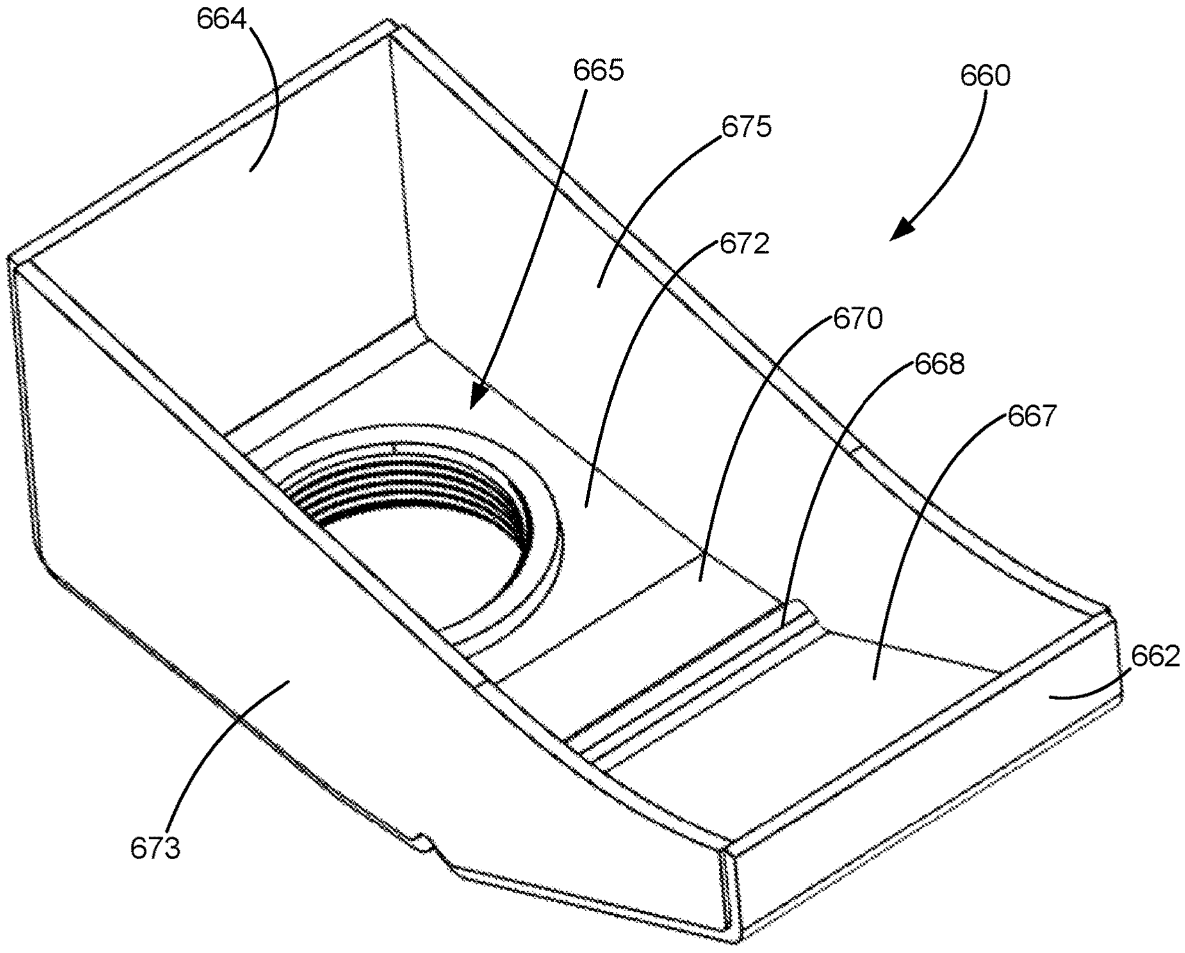
FIG. 20 illustrates a top perspective view of the sink or drain tub illustrated in FIGS. 14-16.

FIG. 20 illustrates a perspective view of the inside of sink or drain tub 660. Bottom wall 665 of drain tub 660 may include a plurality of sections. In particular, bottom wall 665 includes a first sloped section 667, a ridge 668, a second sloped section 670 and a level section 672. First sloped section 667 is located under through hole 622 in tray 612 and is configured to receive contaminated washout that first empties into drain tub 660 from through hole 622 (See FIG. 15). First sloped section 667 may be hit by a jet of water and contaminated washout and is sloped such that the jet of water and contaminated washout will ricochet to the back of sink or drain tub 660. Ridge 668 as illustrated in FIG. 20 is a raised area to slow down the roll of contaminated washout toward male cam-lock 634. However, ridge 668 may also be a level section. Together first sloped section 667, ridge 668 and second sloped section 670 may hold up to a level six, seven or eight of slump and allows contaminated washout to progressively roll towards level section 672 where male cam-lock 634 may be screwed into drain tub 660. For example, male cam-lock 634 may be coupled to a female cam-lock, such a female cam-lock 236 of FIG. 3, that is configured to be coupled to a reclaiming hose, which is coupled to a washout pump and a reclaiming storage container on a concrete truck. The washout pump is configured to suck contaminated washout that has drained through grate 628 from tray 612 into drain tub 660 to a reclaiming storage container on a concrete truck, leaving clean washout, such as gravel and rock, in the specialized wheelbarrow 601 for recycling.

The washout reclaiming system that uses a specialized wheelbarrow described above performs better for the environment and is easy to use. Contractors may own the specialized wheelbarrows of the washout reclaiming system 100, while the concrete drivers are responsible for the components of concrete truck 102. The team effort of properly disposing of washout keeps each party accountable.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A washout reclaiming system comprising:
a wheelbarrow comprising:
a tray having an interior surface, an opposing exterior surface and a through hole extending from the interior surface to the exterior surface; and
a grate mounted to the interior surface of the tray and configured to cover the through hole in the tray, the grate including a plurality of perforations and having a height defined by a top plate and at least one side plate.

2. The washout reclaiming system of claim 1, wherein the at least one side plate comprises the plurality of perforations.

3. The washout reclaiming system of claim 1, wherein the top plate is free of perforations and the at least one side plate comprises the plurality of perforations.

4. The washout reclaiming system of claim 1, wherein the grate has a rectangular shape that covers the through hole in the tray of the wheelbarrow.

5. The washout reclaiming system of claim 1, wherein the grate defines a front end, at least one elongated channel and a back end, wherein the front end occupies a portion of a front wall of the tray, the elongated channel extends across the through hole in the tray of the wheelbarrow and the back end occupies a portion of a bottom wall of the tray of the wheelbarrow.

6. The washout reclaiming system of claim 5, wherein the front end of the grate tapers from a top surface of the grate to the interior surface of the front wall of the tray of the wheelbarrow.

7. The washout reclaiming system of claim 5, wherein the back end of the grate tapers from a top surface of the grate to the interior surface of the bottom wall of the tray of the wheelbarrow.

8. A washout reclaiming system comprising:

a wheelbarrow comprising:

a tray having an interior surface, an opposing exterior surface and a through hole extending from the interior surface to the exterior surface;

a grate mounted to the interior surface of the tray and configured to cover the through hole in the tray, wherein the grate includes a plurality of perforations; and a drain tub mounted to the exterior surface of the tray and having a portion of the drain tub that is configured to be located below the through hole in the tray, wherein the drain tub includes a front wall, an opposing back wall, a bottom wall and a pair of opposing side walls, wherein the bottom wall includes a first sloped section, a ridge, a second sloped section and a level section.

9. The washout reclaiming system of claim 8, wherein the first sloped section in the bottom wall of the drain tub is located below the through hole in the tray of the wheelbarrow.

10. The washout reclaiming system of claim 8, wherein the level section in the bottom wall of the drain tub includes an opening for coupling to a hose configured to deliver contaminated washout material from the drain tub to a holding tank.

11. The washout reclaiming system of claim 8, wherein the grate comprises a top plate free of perforations and a pair of opposing side plates having the plurality of perforations.

12. The washout reclaiming system of claim 11, wherein the grate further comprises at least one channel located between the top plate, the pair of opposing side plates and the tray of the wheelbarrow to guide washout material from the plurality of perforations in the opposing side plates to the through hole in the tray of the wheelbarrow.

13. The washout reclaiming system of claim 8, wherein the grate extends from a front end that is located adjacent to a front wall of the tray of the wheelbarrow to a back end that is located adjacent to a bottom wall of the tray of the wheelbarrow.

14. The washout reclaiming system of claim 8, wherein the plurality of perforations are sized between ⅛th and ⅜th of an inch in diameter allow.

15. A washout reclaiming system comprising:

a wheelbarrow comprising:

a tray having an interior surface, an opposing exterior surface and a through hole extending from the interior surface to the exterior surface;

a grate mounted to the interior surface of the tray and configured to cover the through hole in the tray, wherein the grate includes a plurality of perforations;

a drain tub mounted to the exterior surface of the tray, wherein a portion of the drain tub is configured to be located below the through hole in the tray and the drain tub has a bottom wall including an opening;

a reclaiming hose having a first end coupled to the opening in the drain tub and a second end coupled to a washout pump and reclaiming storage tank; and a spray hose coupled to a clean water tank; and wherein the spray hose sends washout material into the tray of the wheelbarrow, the grate allows a contaminated portion of the washout material to proceed through the through hole in the tray to the drain tub and keeps a clean portion of the washout material in the tray and the washout pump sucks the contaminated portion of the washout material from the drain tub through the reclaiming hose to the reclaiming storage tank.

16. The washout reclaiming system of claim 15, wherein the drain tub includes a front wall, an opposing back wall, a bottom wall and a pair of opposing side walls, wherein the bottom wall includes a first sloped section, a ridge, a second sloped section and a level section.

17. The washout reclaiming system of claim 16, wherein the first sloped section in the bottom wall of the drain tub is located below the through hole in the tray of the wheelbarrow.

18. The washout reclaiming system of claim 15, wherein the grate comprises a top plate free of perforations and a pair of opposing side plates having the plurality of perforations.

* * * * *